Figure 1:
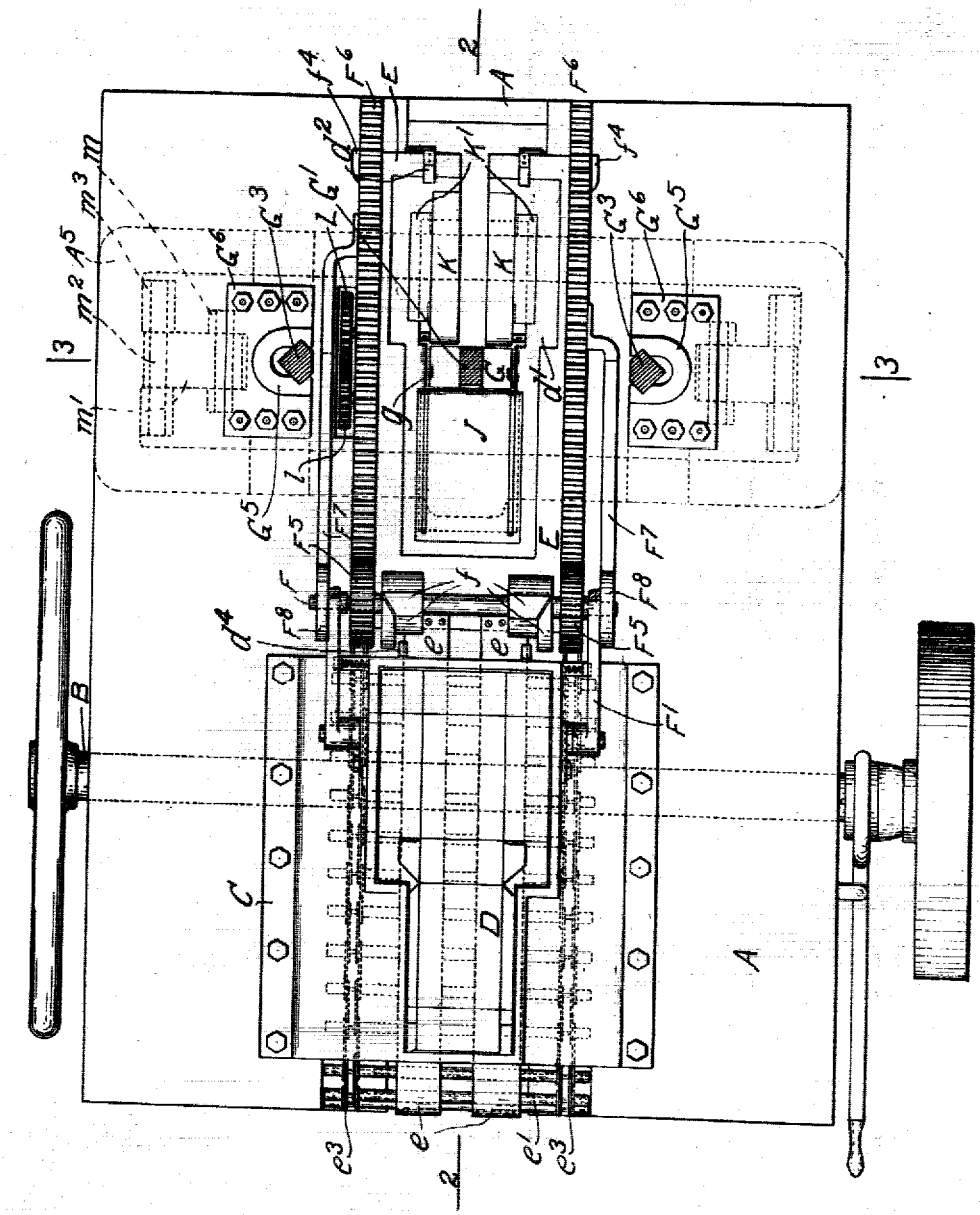

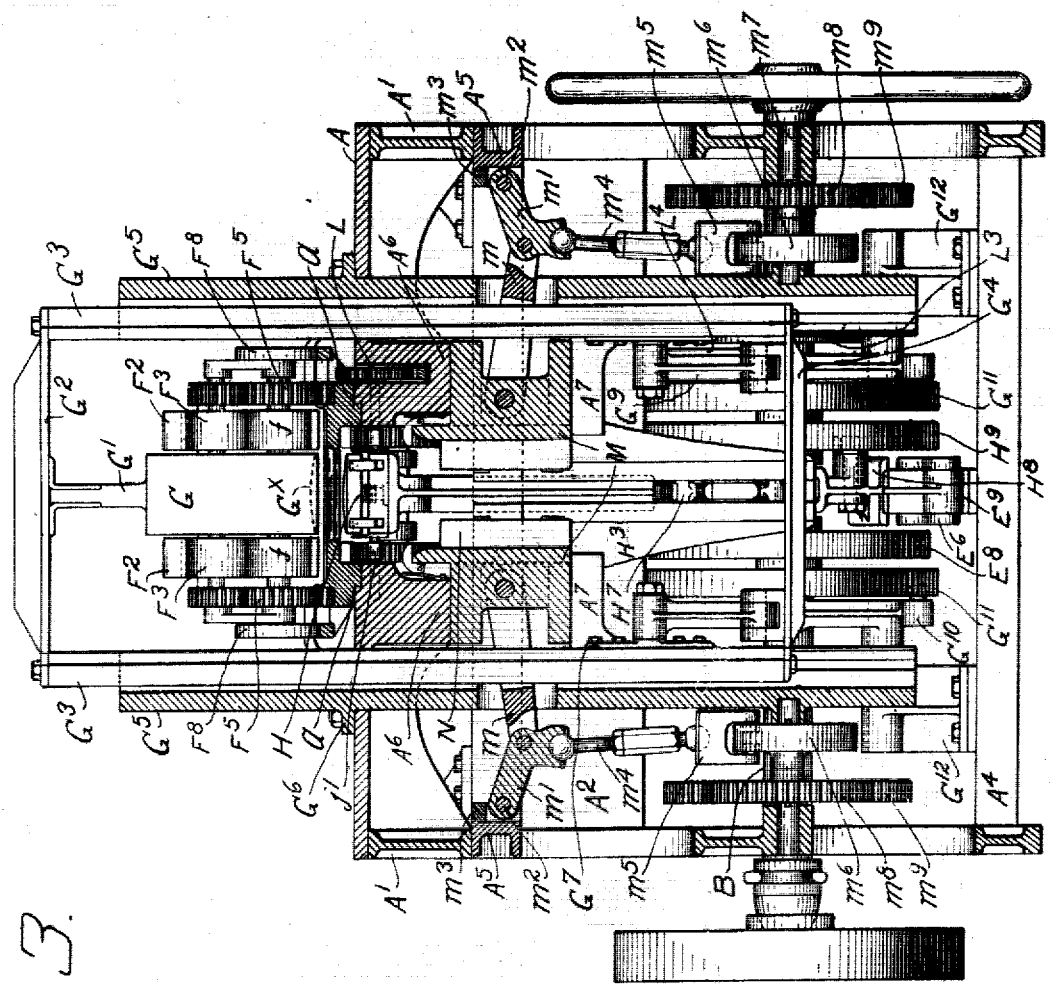

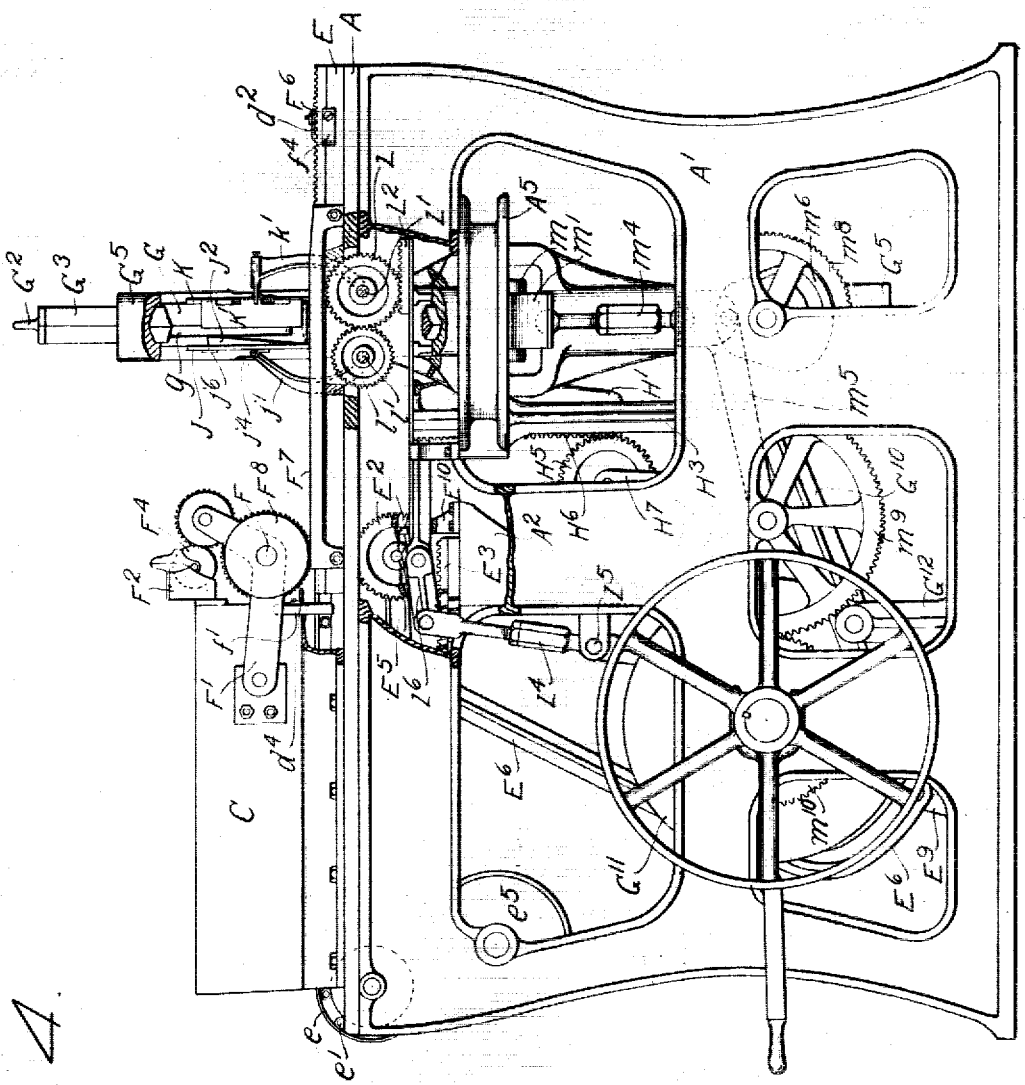

No. 824,769. PATENTED JULY 3, 1906.
C. E. WHITE.
MACHINE FOR MAKING PAPER BOXES.
APPLICATION FILED JAN. 7, 1902.
9 SHEETS—SHEET 5.
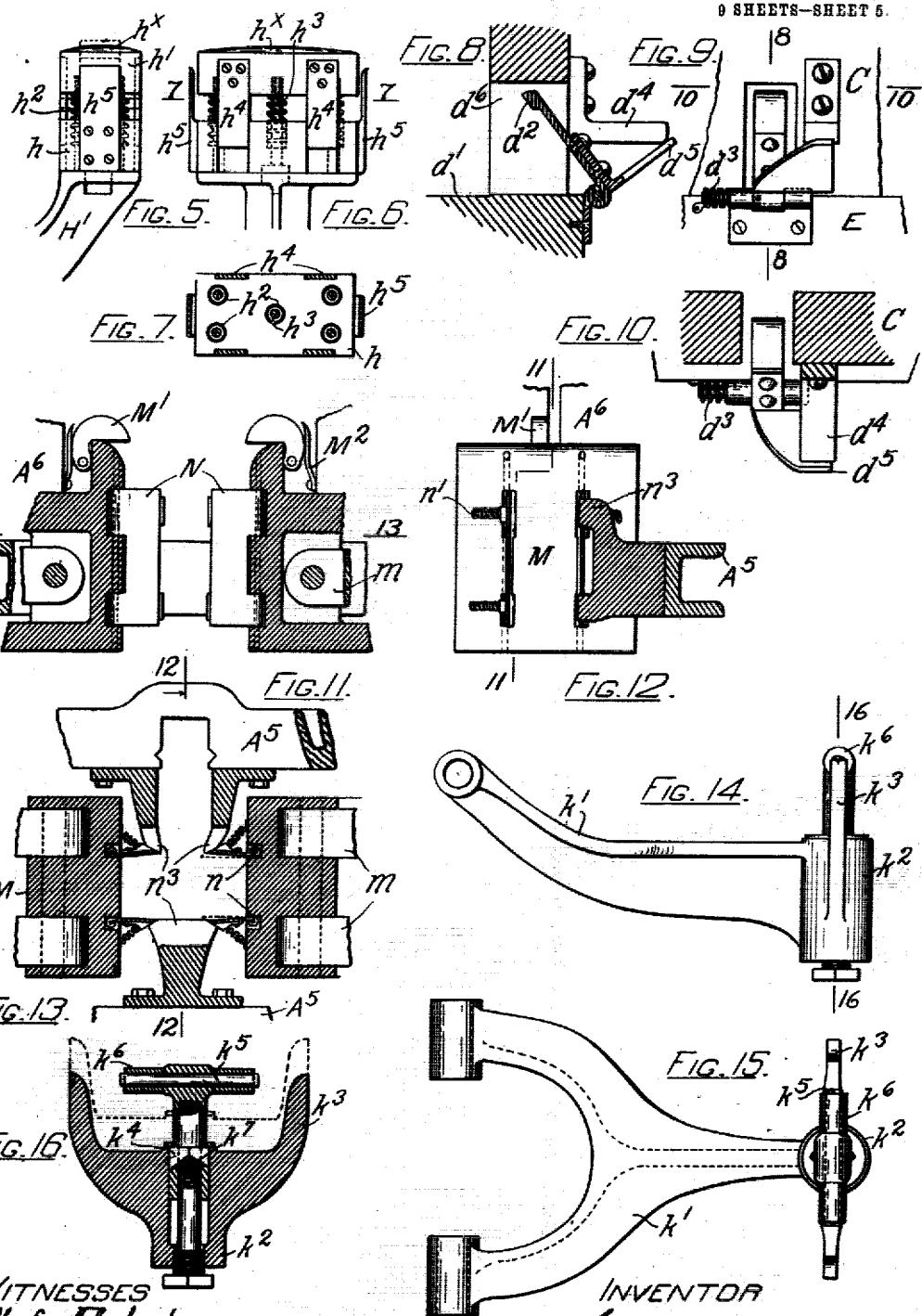
WITNESSES
INVENTOR No. 824,769. PATENTED JULY 3, 1906.
C. E. WHITE.
MACHINE FOR MAKING PAPER BOXES.
APPLICATION FILED JAN. 7, 1902.
9 SHEETS—SHEET 6.
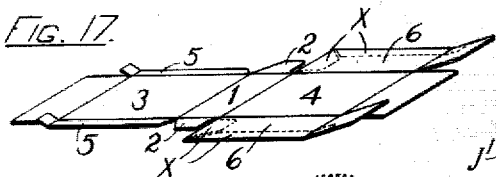
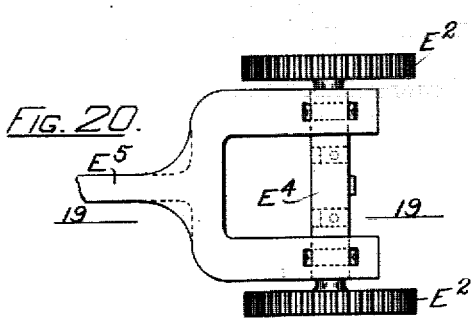
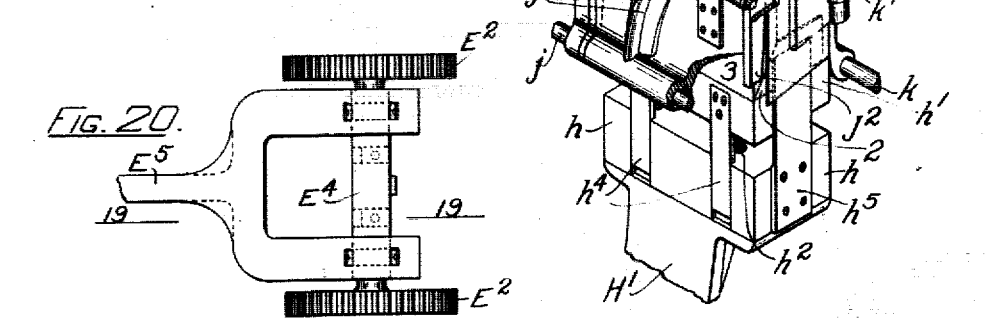
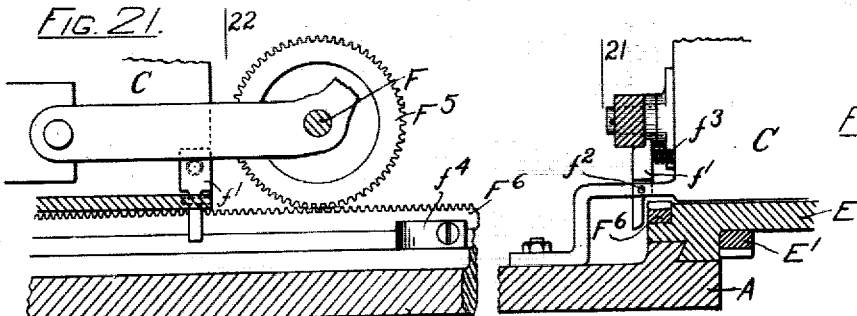
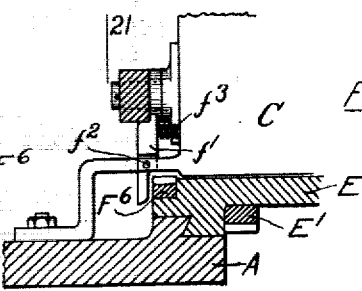
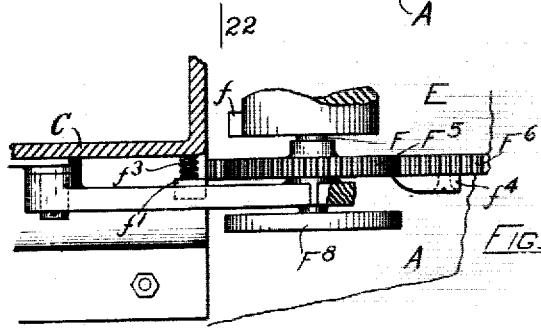
WITNESSES
INVENTOR No. 824,769. PATENTED JULY 3, 1906.
C. E. WHITE.
MACHINE FOR MAKING PAPER BOXES.
APPLICATION FILED JAN. 7, 1902.

9 SHEETS—SHEET 7.

WITNESSES:
M. V. Foley.
M. E. Flaherty.

INVENTOR:
Charles E. White
by Geo. O. G. ...
his Attorney

No. 824,769. PATENTED JULY 3, 1906.
C. E. WHITE.
MACHINE FOR MAKING PAPER BOXES.
APPLICATION FILED JAN. 7, 1902.

9 SHEETS—SHEET 9.

WITNESSES:
M. V. Foley.
M. E. Flaherty.

INVENTOR:
Charles E. White

UNITED STATES PATENT OFFICE.

CHARLES E. WHITE, OF NEW BRITAIN, CONNECTICUT, ASSIGNOR TO THE AMERICAN TYPE FOUNDERS' COMPANY, OF NEW YORK, N. Y., A CORPORATION OF NEW JERSEY.

MACHINE FOR MAKING PAPER BOXES.

No. 824,769.  Specification of Letters Patent.  Patented July 3, 1906.

Application filed January 7, 1902. Serial No. 88,784.

*To all whom it may concern:*

Be it known that I, CHARLES E. WHITE, of New Britain, in the county of Hartford and State of Connecticut, have invented a new and useful Improvement in Machines for Making Paper Boxes, of which the following is a specification.

While my machine has been especially planned and adapted to make a paper box from a blank of peculiar shape, such as will be more especially described below, its mechanisms may be adapted to make boxes from blanks of other shapes, the peculiar features of the mechanisms to be described being especially adapted to make a box having particularly square edges and folded with great accuracy. These features are attained in my machine by careful registration and by the peculiar characteristics and operation of the former and follower which grip the blank while in the carrier and before any portion of the folding operation takes place and which are provided with coöperating surfaces adapted to stretch the blank along its bottom edges, so that it retains a right-angled shape around the bottom, causing the bottom to remain flat when the box is completed.

Another peculiarity of my machine lies in the fact that the blank is carried from the blank pile to the former in a recess in the carrier, which recess is of the shape of the blank, so that the carrier may slide under the blank pile and register therewith without any such interference as would exist if gages were provided to define the position of the blank upon the carrier. Thus the blank when first received from the bottom of the pile takes a predetermined position on the carrier, which position enables it to register accurately with the former when the carrier has reached its forward position.

Another peculiarity of this machine lies in the fact that the mechanism whereby the blank is folded about the former is carried by the carrier and forms, in fact, a portion of the support by means of which the blank is retained within the recess of the carrier, so that the blank is received by the carrier in the exact position with relation to the folders which it is to maintain when the folders begin the folding operation.

Another peculiarity of my machine lies in the use of a former which at the time of forming the blank about it is located at one extremity of its stroke, its bottom surface being on substantially the level of the opposing surface of the blank. Thus the entire forming operation by means of which the blank is formed about the former takes place without any movement of the former, the blank being clamped thereto by a clamp, which in its upward movement raises that portion of the blank which is to be clamped to the end of the former very little, if at all, from its recess in the carrier.

Another peculiarity of my invention is the stripping mechanism whereby the completed box is stripped from the former, which stripping mechanism is located upon and moved with the pressers, by means of which the gummed flanges of the blank are pressed together and against the former to cause a thorough adherence of the one flange to the other.

Other peculiarities of my invention will be noted below.

My invention will be understood by reference to the drawings, in which—

Figure 2:
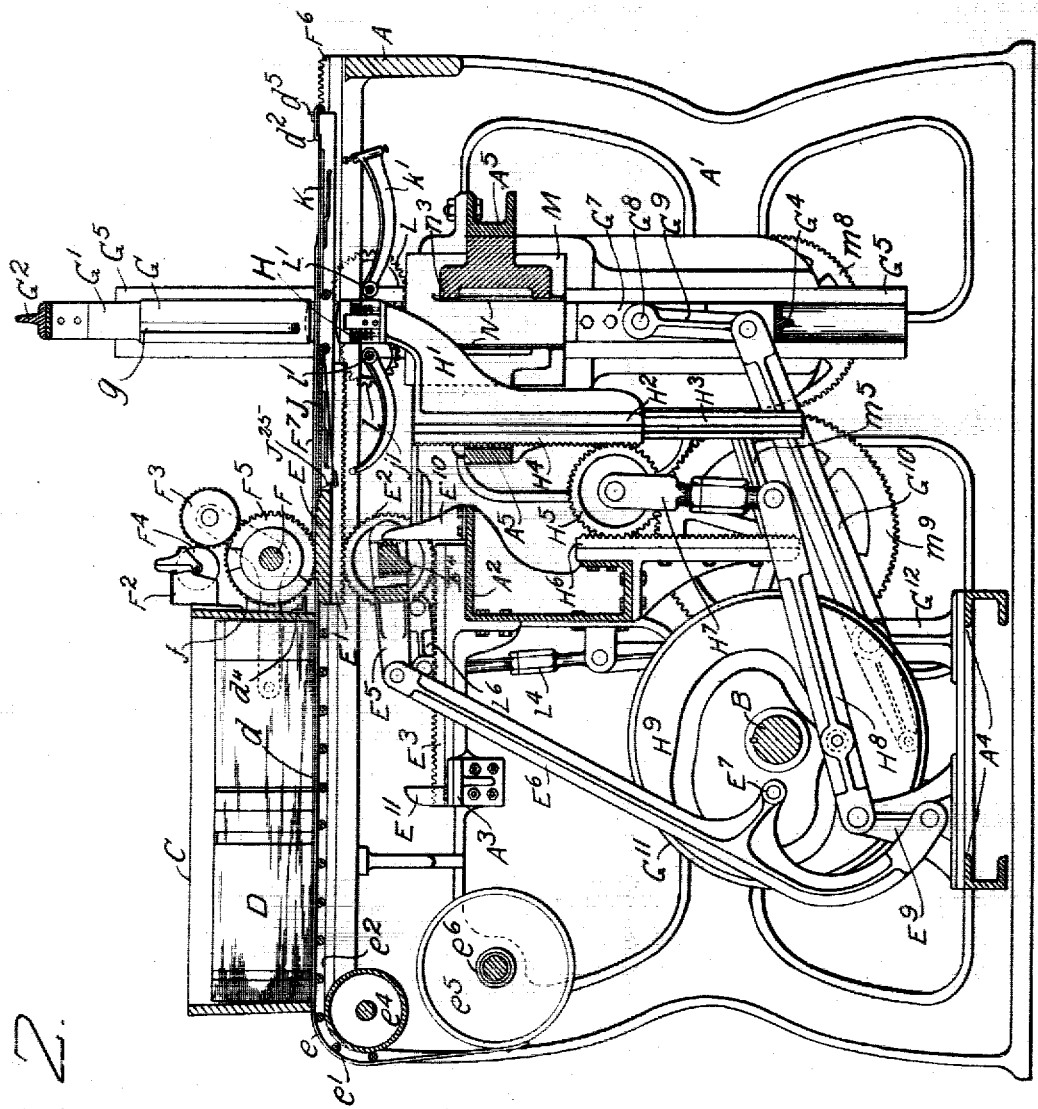
Figure 25:
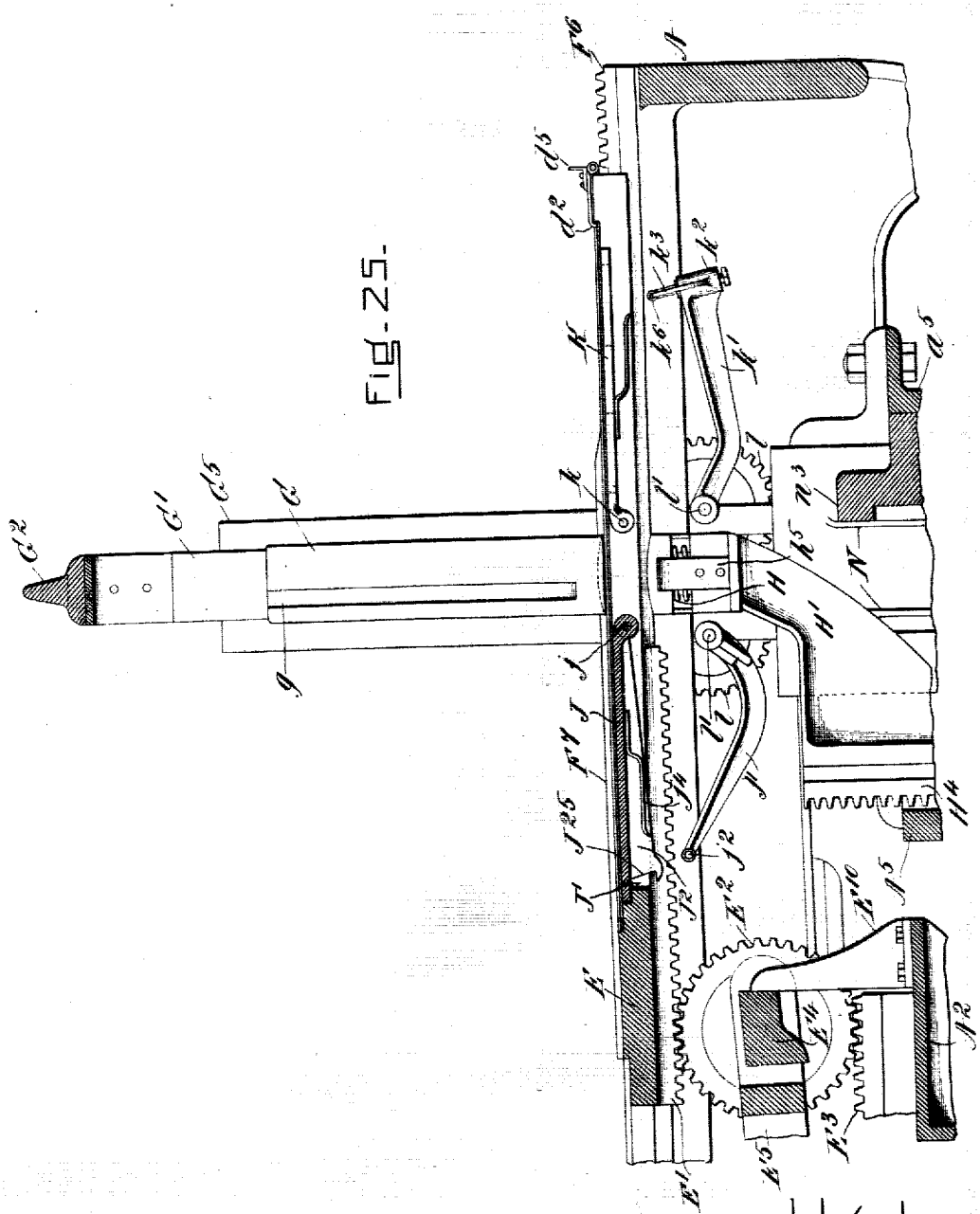
Figure 26:
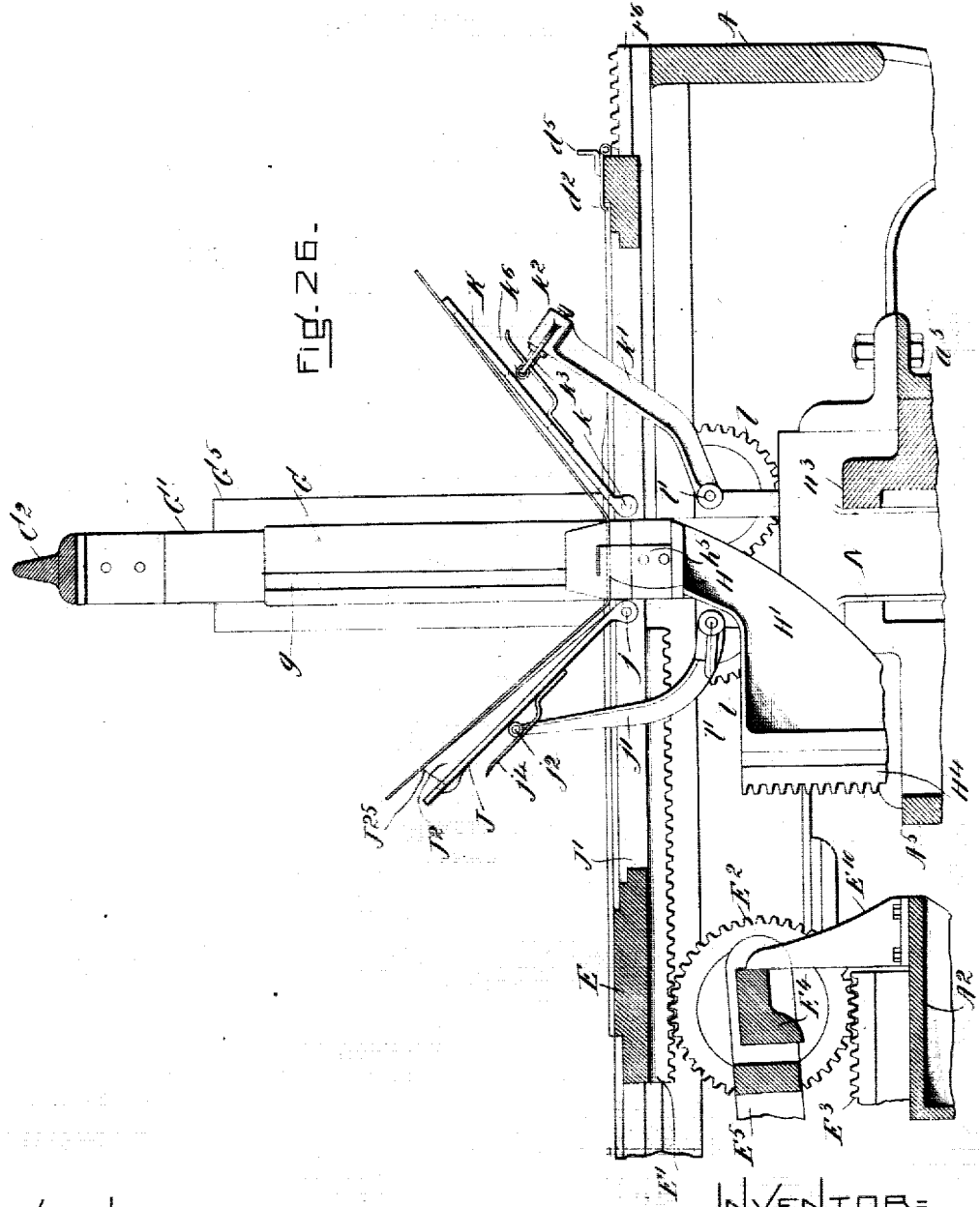
Figure 27:
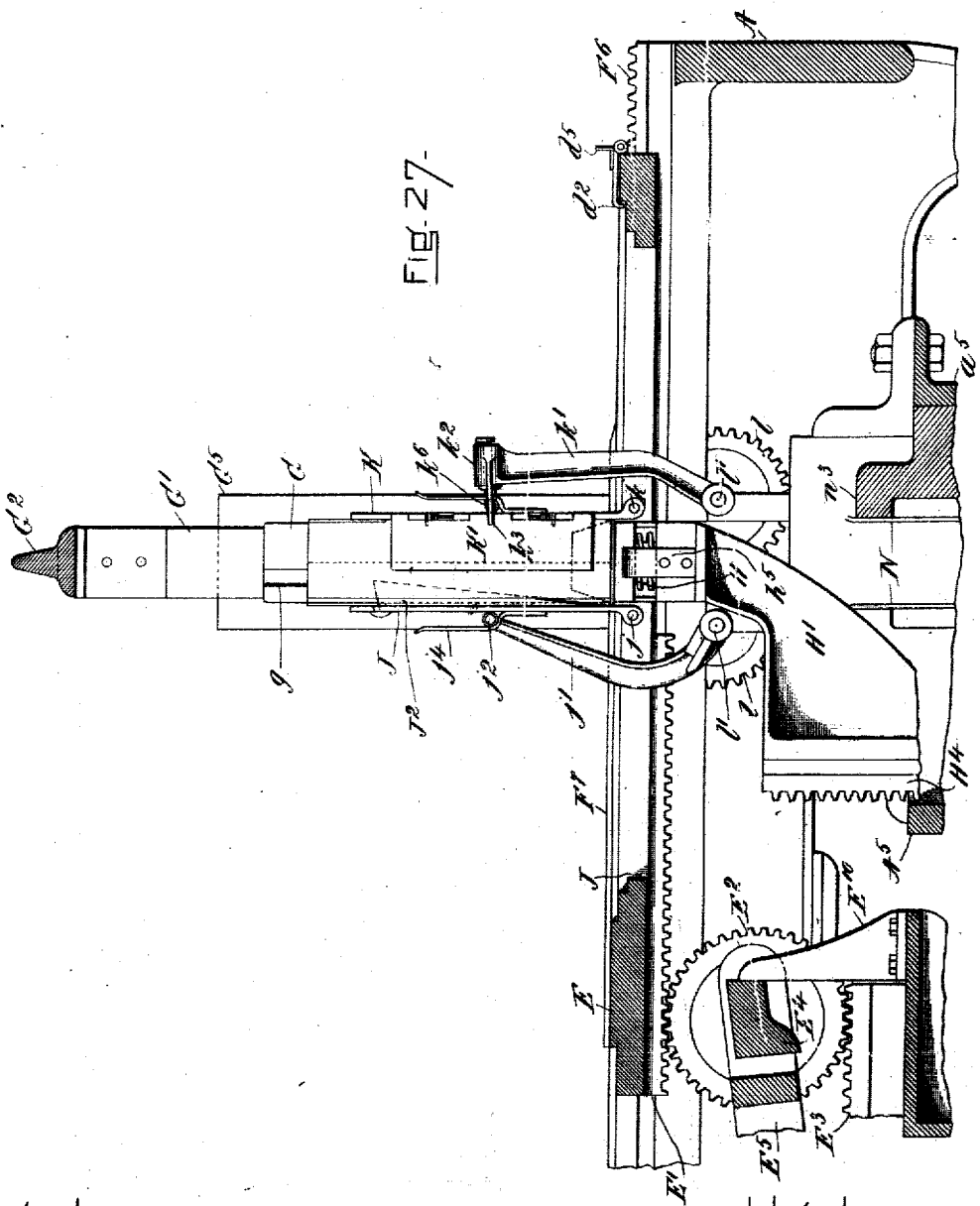

Figure 1 is a plan view of a machine embodying my invention in the best form now known to me, the cross-head frame being in section. Fig. 2 is a longitudinal vertical section taken on lines 2 2 of Fig. 1, certain of the parts being in elevation. Fig. 3 is a cross-section taken on line 3 3 of Fig. 1, parts being in elevation. Fig. 4 is a side elevation, a portion of the machine being broken away to show parts which would otherwise be hidden and also showing the folding mechanism in action. Fig. 5 is a side elevation of the follower, by means of which the blank is clamped against the former, Fig. 6 being a front elevation thereof, and Fig. 7 a horizontal section on line 7 7 of Fig. 6. Fig. 8 is a sectional detail on line 8 8 of Fig. 9. Fig. 9 is a front elevation of the gripping mechanism, Fig. 10 being a sectional view on line 10 10 of Fig. 9. Figs. 11, 12, and 13 are details of the pressers. Fig. 14 is a side elevation, and Fig. 15 a plan, of the mechanism for causing the operation of the main folders, Fig. 16 being a section on line 16 16 of Fig. 14. Fig. 17 is a perspective of the blank, and Fig. 18 an enlarged view of the folding mechanism. Figs. 19 and 20 are details of a portion of the means for operating the carrier, Fig. 19 being a section on line 19 19 of Fig. 20. Figs. 21, 22, and 23 are details of the gum-roll-engaging-mechanism, Fig. 21 being a section on line 21 21 of Fig. 22, and Fig. 22 a section on line 22 22 of Fig. 21, Fig. 23 being a plan. Fig. 24 is a detail of the gumming-surface of the gum-roll. Figs. 25, 26, and 27 show the carrier, former, and follower in operative position with relation to each other, Fig. 25 showing the parts when the blank has been brought under the former and before the follower has been raised, Fig. 26 showing the follower in place against the under surface of the former, clamping the blank thereto, the folders having been partly lifted to perform the folding operation, Fig. 27 showing the parts while the blank is being embraced by the folders and pressed by them against the former, these three views being in vertical section.

A is a table supported upon a suitable frame A', in which is mounted the cam-shaft B. Upon the table A is mounted a frame or hopper C of suitable shape to receive and maintain in position a pile of blanks D. The hopper C is raised sufficiently high above the surface of the table A to allow a carrier E to move thereunder to receive and carry out the lower one $d$ of the pile of blanks. The carrier may be made sufficiently long to sustain the pile of blanks after its recessed portion has passed out from under the hopper. For this purpose, however, I prefer to provide two straps $e$, preferably of thin steel, which rest upon a series of cross-rolls $e'$, running upon a suitable track $e^2$ on the table A, which rolls are connected by chains $e^3$ to keep them at a predetermined distance apart, forming a supporting-conveyer for the straps $e$. This conveyer and its straps pass over an idler-roll $e^4$ and drum $e^5$, upon which they are wound when the carrier is under the hopper. This drum may be rotated either positively or by a spring, as may seem best, to wind up the straps $e$. As shown, a spring $e^6$, suitably connected, is provided for the purpose.

The carrier E, as shown, slides in a dovetail $a$ on the table A, and is preferably reciprocated and in the following manner: Upon each side of its under surface is a rack E', engaging with a traveling gear $E^2$. Below and engaging with each gear is a second rack $E^3$, supported upon suitable supports $A^2 A^3$, carried by the frame A'. These gears $E^2$ are mounted in a frame comprising a connecting-rod $E^5$, having a forked end through the arms of which passes a cross-bar $E^4$, carrying an axle at each end, each axle carrying one of the gears $E^2$, the load or strain on the mechanism being thus equally and advantageously distributed.

The rear end of the connecting-rod $E^5$ is connected to the upper end of a cam-lever $E^6$, provided with a cam-roll $E^7$, running in a groove in the cam $E^8$. The lower end of this cam-lever $E^6$ is pivotally connected to a standard $E^t$, mounted upon the cross-brace $A^4$ at the bottom of the machine. The groove in said cam $E^8$ is so constructed as to give a reciprocating motion to the carrier E with a sufficient dwell, when the carrier is in its outward position, to allow the proper folding operations to take place, as will be described below. To insure the registration of the carrier with the former, stops should be provided to limit its movement. Such stops may engage directly with the carrier. I prefer, however, to locate them where they will engage the carrier-moving mechanism, and for this purpose have shown them at $E^{10}$ and $E^{11}$, located to engage the cross-bar $E^4$. If desired, the cross-bar $E^4$ may be provided on each side with a boss to strike these stops, and should a spring be used to face the end of the boss it will ease its blow against its stop. I prefer to use this double rack and pinion mechanism to give to the carrier E its reciprocating movement in order to utilize a short throw of the cam-lever to accomplish a comparatively long and rapid throw of the carrier.

The carrier E is provided with a recess or opening $d'$, which is preferably of the shape of the blank and has a suitable bottom, and the carrier is so registered with the hopper C that when the carrier is in its rearward position the bottom blank of the pile will fall into the recess, the depth of the recess being substantially the thickness of the blank in order that as the carrier goes forward it will only engage the blank which it is intended to convey.

In order that the blank may be held firmly in place upon the carrier, I prefer to provide one or more grippers $d^2$, hinged to the front edge thereof, (see Figs. 8, 9, and 10,) each gripper being held normally in its horizontal or gripping position by means of a spring $d^3$, and in order that the gripper may be raised to allow the blank to fall into the recess $d'$ in the carrier I prefer to provide a stop $d^4$ for each gripper attached to the front of the hopper C in such position that it will strike the tail $d^5$ of its gripper, thus lifting the gripper into the position shown in Fig. 8, the front of the hopper being slotted, as indicated at $d^6$, to enable the gripper to assume this position. As the carrier E moves forward and the tail of the gripper leaves the stop $d^4$, the gripper resumes its horizontal position owing to the spring $d^3$ thus gripping the blank upon the carrier. If the spring $d^3$ is of proper tension, the blank may be drawn from under the grippers by the operation of folding the blank. This latter construction is believed to be the best, as without complicated mechanism the blank is clamped at the middle and at one end before the folding operation begins, and the releasing is performed by one of the folders acting on the blank between the two places at which it is held.

In order to gum the proper portion of the blank, I have provided a gum-roll consisting of a shaft F, journaled in angle-arms F', preferably pivoted to the side of the hopper C. This shaft carries gumming-surfaces $f$, adapted to receive gum from the gum-box $F^2$ by means of the intermediate rolls $F^3$ $F^4$. In order to rotate the shaft F to cause its gumming-surfaces to engage both the roll $F^3$ and the blank, I prefer to provide pinions $F^5$ near each end of the shaft F, each of which meshes with a rack $F^6$, mounted on the upper surface of the carrier E, so that as the carrier reciprocates a rotary motion will be imparted to the gummers. As it is desirable that the gum-roll shall not come in contact with the carrier, I have provided cam-surfaces $F^7$, one on each side of the carrier, upon which run cam-rolls $F^8$, each mounted on the shaft F. Thus when the carrier moves forward the gummed surfaces will gum the proper portions of the blank, but when the portions of the blank to be gummed have passed from beneath the gum-roll the cam-rolls $F^8$, riding up upon the upper portions of the cam $F^7$, will be lifted sufficiently high to clear the upper surface of the carrier without disengaging the pinion-teeth from those of the rack, the pivoting of the angle-arms F' allowing this movement on the part of the gum-roll.

I prefer to provide a latch $f'$ on each side of the hopper C, by means of which the angle-arms and gum-roll will be held in their upper position instead of relying solely on the cam-surface for this purpose. This latch is pivoted at $f^2$ to the hopper or angle-arm support and is normally forced inward by the spring $f^3$, which presses its tail outward. A tripper $f^4$, mounted on the carrier E, engages the tail of the latch $f'$ and forces it, against the force of the spring $f^3$, to release the angle-arms F' and allow them to fall, so that the cam-rolls again roll on the cam-surface and the gum-roll on the carrier in position to gum the flanges of the blank as it is brought from the hopper.

I have shown in Fig. 24 a detail of the gumming-surface of the shaft, especially applicable for use where as in making the box for which this machine is especially adapted a single gummed surface is to overlap a joint between two portions of a blank, to which portions said gummed surface is to adhere. It will be noted in Fig. 17 that the ears 2 and the flanges 5 of the blank join and the flange 6, which has been gummed, is folded over to seal them together. It is evident that if the gummed surfaces $x$ upon the flange 6 were continuous the gum would ooze through this joint between 2 and 5. It will be noted from Fig. 17, however, that the gummed surface of the flange 6 is not continuous, and this lack of continuity is caused by providing a groove $f^x$ in each gumming portion of the gum-roll sufficiently deep and wide not to receive gum from the gum-supply. Thus that portion of the flange which is to cover this joint will not be gummed for preferably for, say, one-sixteenth of an inch on each side of this joint-covering surface, and where the flange 6 is pressed against the rest of the folded blank gum cannot ooze through the joint in question.

The folding mechanism, as shown is constructed as follows: G is a former around which the blank is to be folded by suitable means. It is mounted on the end of a stem G', whereby it is connected with a vertically-reciprocating frame comprising a cross-bar $G^2$, mounted on the upper ends of two vertical slides $G^3$, connected at the bottom by a cross-bar $G^4$, said slides sliding in vertical guides $G^5$, supported by means of flanges $G^6$, bolted to the table A. In order to give to this frame and the former its reciprocating movements at the proper time, there is attached to each slide $G^3$ a strap $G^7$, having thereon a stud $G^8$, carrying a link $G^9$, adapted to swing on said stud $G^8$. The lower end of this link is connected by a cam-lever $G^{10}$ with a cam $G^{11}$, the fulcrum of this lever being in a standard $G^{12}$, mounted on the cross-brace $A^4$. The cam-groove of the cam $G^{11}$ is constructed in the ordinary manner to give the former the movements hereinafter described. The former G is normally in its highest position, as shown in Figs 2, 3, and 4, in which position its bottom is on substantially the level of the opposing surface of the blank carried by the carrier E, and in the machine, as shown, the blank is folded about the former while the former is in this position, from which position it moves to carry the folded blank down to the presser below, by which the box is completed.

Before the folding operation takes place the blank while still in the carrier is gripped against the bottom of the former G by means of a follower H of peculiar construction. (See Figs. 5, 6, and 7.) This follower, as shown, consists of two parts, a bed-piece $h$ and a yielding clamp $h'$, supported upon springs $h^2$, which normally hold it away from the bed-piece $h$, each spring surrounding a guide in $h^3$. Guides $h^4$ are provided, between which the bed-piece $h$ moves. The bed-piece $h$ also carries two lips $h^5$, the ends of which are below the normal level of the clamp $h'$, but which when the clamp $h'$ engages the former G may project somewhat beyond the upper surface of the clamp $h'$, depending upon the pressure exerted, thus becoming effective to fold certain portions of the blank, as will be below described. The follower H is supported immediately under the former G to register therewith. It is given a vertical movement by the following means: preferably it is supported upon an angled or curved arm H' integral with a slide $H^2$, sliding in ways $H^3$, supported from the yoke-piece $A^5$, hung under the table A. Vertical movement is given to this follower H in the following manner: The slide H² carries a rack H⁴, which engages with a pinion H⁵. A second rack H⁶, hung from the cross-brace A⁴, engages with the opposite side of the said pinion H⁵ in order to multiply the travel of the follower H. A vertical reciprocating motion is given to the axis of the pinion H⁵ by means of a connecting rod or link H⁷, in which said axis is journaled and which connects it with a cam-lever H⁸, fulcrumed upon the standard E⁰ and having a cam-roll running in a cam-groove in the cam H⁹. The function of this follower is to rise at the proper time when the carrier is in its forward position and clamp so much of the blank as is to form the bottom 1 of the box against the under side of the former G. The clamping pressure given to the follower is sufficient to cause the clamp h' to yield somewhat, enough to cause the lips h⁵ to protrude beyond the clamp h' and turn up the ears 2 of the blank against the former, holding them there until the sides 3 and 4 of the box have been thrown up and the flanges 5 and 6 have been folded sufficiently far about the former to insure the holding of the ears 2 in place. The follower H is then withdrawn slightly, not sufficiently, to release its hold upon the part 1 of the blank, but enough to withdraw the lips h⁵ from above the level of the clamp h', so that they will not interfere with the further folding operation.

In describing the further operation of folding it may be as well to state here that I have called the under surface of the former the "bottom," the wider vertical sides thereof the "sides," and the narrower vertical sides the "ends." While this nomenclature is not exact, it is concise and tenable. To the corresponding parts of the box I give the same names, the "ends" being made of the overlapping flanges.

In order to insure an absolutely square edge around the bottom 1 of the finished box, I have found it desirable to give to the bottom of the former G a slight concave and to the opposing surface or top of the clamp a corresponding convex, so that while the blank is in the machine the angle between its sides and ears and its bottom will be somewhat less than a right angle, thus causing a slight strain of the outer surface or skin of the blank which will allow the bottom 1 of the box to remain in a plane at right angles to the sides and ends after the box has been removed from the machine, so that it will not bulge as has been usual heretofore. This convexing of the clamp h' will be seen at hˣ, Figs. 5 and 6, and the concaving of the former at Gˣ, Figs. 2 and 3. The next operation in the making of the box is the folding of the side 3 with its flanges 5 against the former. Both this folding operation and the folding of the side 4 and its flanges 6 are caused in the preferred form of my invention with the assistance of means carried by the carrier.

Not only is the carrier recessed at d', as described above, but the bottom of the recess is formed by folding-plates, on which the blank is received from the hopper and on which it rests until its sides are folded by mechanism acting upon these plates. The carrier thus not only serves as a carrier in the sense that it conveys the blank from a receiving position to a position under the former, but it also serves as a support for the blank at the beginning of the folding operation and a frame in which the folders are hung. The folding-plate J for the side 3 and its flanges are hung upon a cross-rod j, mounted in the carrier E just clear of the edge of the opening through which the former G carries the blank, as will be described later. This plate J is slotted at J', and in these slots are hung on the rod j two shear-plates J², the front edges of which are curved slightly or smoothed off, so that they will not cut the blank. In order to prevent the shear-plates J² from falling through the slots J' in the plate J when it is in a horizontal position, they are provided with beveled ends J²⁵, which are adapted to engage with similarly beveled ends to the slots J'. (See Fig. 2.) The slots J' in the plate J are so located with relation to the ends of the former G that when the plate J is moved into a vertical position in folding the blank by means to be described the shear-folders J² on being pushed through the slots J' will pass one on each side of the former G and sufficiently near thereto to cause the sides of the blank 5, which is lifted by the plate J during this operation, to be turned or folded about the ends of the former G.

The side 4 of the blank, with its flanges 6, rests on two plates K K, each of which is hung upon a stud k, which studs project from the inner wall of the opening in the carrier and together form the axis for the folder, which is made up of these two plates. Each plate K carries a wing K' hinged thereto, this construction being such that when these plates K are lifted into a vertical position their wings K' may be turned about the ends of the former. I prefer to make this winged folder in the form of two plates K, each carrying a wing K', as above described, in order that the movement of the carrier may overlap that of the former in its upward stroke, thus saving some time in the operation of the machine; but it is evident that this winged folder may be made in one piece except for the objection suggested. In practice the part 4 of the blank is first lifted at right angles to the part 1 of the blank by the folders K K, after which the wings K' are operated to turn the gummed flanges 6 of the blank about the ends of the former. As this operation is timed to take place after the side 3 and its flanges 5 have been folded, the gummed surfaces of the flanges 6 of the blank will overlap the flanges 5 and ears 2, so that by the application of sufficient pressure thereafter the flanges 6 will be caused to adhere to the flanges 5 and ears 2. Before the application of pressure takes place the shear-plates $J^2$ must be first withdrawn or the folded blank be carried out from between them unless they are sufficiently small not to interfere with the proper movement of the gummed flanges 6 and the flanges 5. As soon as the folders have turned the blank about the former sufficiently far to cause the flanges to hold the ears 2 in place, the bed-piece $h$ is withdrawn sufficiently to withdraw the lips $h^5$ to the level of the clamp $h'$, so that they will not interfere with the further folding operation, but without, however, causing the clamp to release the blank.

The inner walls of the opening in the carrier E are suitably recessed to support the plates J and K and the wings $K'$ in substantially horizontal position and to hold the shear-plates $J^2$ so that their upper surfaces will be at substantially the level of the plate J. These plates J and K are preferably operated in the following manner: Just below the table A and on one side of the carrier E are located two pinions L $l$. Each pinion is mounted on a rock-shaft $L'$ $l'$, journaled in the table A, these pinions being in mesh and the pinion $l$ being slightly smaller than the pinion L. Each rock-shaft carries a rocker-arm $j'$ $k'$. The arm $j'$ carries at its free end a cross-bar $j^2$ sufficiently long to engage the under side of the shear-plates $J^2$ and provided at each end with rollers $j^3$, so that as the rocker-arm is given a movement through an arc of, say, ninety degrees the cross-bar rollers $j^3$ first strike the shear-plates $J^2$ and drive them through the folding-plate J, after which the cross-bar striking the plate J lifts both it and the shear-plates, together with the side 3 of the blank, until not only does the side 3 strike the former G, but the flanges 5 are folded about the ends of the former. Hooks $j^4$ are attached to the under side of the plate J, with which the cross-bar $j^2$ engages to withdraw the plate J at the proper time. Each shear-plate is provided with a stop $j^8$ to keep it from slipping through the slots $J'$. The rocker-arm $k'$ is constructed in a somewhat similar manner, but its extremity is preferably constructed as shown in Figs. 14, 15, and 16. The arm $k'$ carries a head $k^2$, having projecting therefrom two fingers $k^3$, one on each side of the head and so far apart that they will not engage with the plates K, but with the wings $K'$. The center of the head $k^2$ is recessed to receive a stud $k^4$, which carries the plate-lifting portion of the head, consisting of a cross-bar $k^5$, supported on said stud $k^4$ and carrying at each end a roll $k^6$.

The stud $k^4$ is held in a position slightly in advance of the fingers $k^3$ by means of a spring $k^7$, the strength of which is adjustable within the head $k^2$. This construction is such that as the rocker-arm $k'$ is thrown up the rolls $k^6$ will first strike the plates K and lift them and the part 4 of the blank with its flanges 6 into a vertical position. The continued movement of the rocker-arm $k'$ will cause a depression of the cross-bar $k^5$ and its stud $k^4$ within the head, thus projecting the fingers $k^3$ against the wings $K'$ and causing them to turn about the corners of the former and fold the flanges 6 toward the flanges 5 already in place. The relation then established between the fingers $k^3$ and the cross-bar $k^5$ is indicated in Fig. 16, which shows in dotted lines the head and fingers advanced beyond the position of the cross-bar. Movement is given to the gears L $l$ to effect these operations by means of a rack-slide $L^2$ sliding horizontally in ways in the table A, (see Fig. 3,) this reciprocating movement being given by the cam $L^3$ through the lever $L^4$, pivoted to the cross-bar $A^2$ at $L^5$ and connected by an adjustable connecting-rod $L^6$ with the rack-slide $L^2$. The rocker-arm $j'$ is set on its rock-shaft to begin the movement of the plate J before the plates K K begin to rise. The plates K K are provided with hooks corresponding with the hooks $j^4$ on the plate J and for a corresponding purpose. It will be noted that during all this operation the blank is firmly held in place by the pressure of the clamp against the former, the part of the blank which is to form the bottom of the box not being lifted thereby out of the carrier.

After the box has been folded as above described it is necessary that it receive pressure to insure the engagement of the gummed surfaces during their drying. For this purpose I provide pressers M M, which reciprocate in slides formed below the table A by projections $A^6$ from the table and guides $A^7$ bolted to the guides $G^5$. To give the pressers their necessary reciprocations, I provide toggle mechanisms each consisting of a link $m$ and an angle-arm $m'$, which is journaled in a block $m^3$, bolted to the yoke-piece $A^5$, which acts as a thrust-block for the toggle. The other end of each angle-arm is connected to an adjustable link $m^4$, having a yoke $m^5$ straddling a cam $m^6$, by means of which the necessary reciprocating movement is given to the link $m^4$ to straighten out the toggle and break it again. Each cam $m^6$ is mounted on a stud $m^7$, supported in the frame $A'$, and also in the guides $G^5$ for the plunger-frame. Each stud $m^7$ also carries a gear $m^8$, which is in mesh with an intermediate gear $m^9$, which gets its movement from the gear $m^{10}$ on the shaft B.

In order that while pressure is applied by the pressers to the ends of the box the sides of the box shall not bulge out of shape, I prefer to provide each presser M with a pair of side-holders N. Each side-holder N consists of a wing vertically hinged at $n$ in the face of the presser M and held by means of a spring $n'$ in a spreading position with relation to the other holder of its pair, as will be understood from Fig. 13. Cam-surfaces are provided, as at $n^3$, upon suitable projections from the yoke $A^5$, by means of which the holders are brought into position at right angles to the pressers M when the pressers reciprocate toward each other, as is indicated in dotted lines in Fig. 13. Thus the nearer the pressers come together in compressing the ends of the blank about the former the closer are these holders pressed against the sides of the blank, so that the box will maintain its rectangular form in cross-section during this pressing operation.

After the folding operation has taken place as above described the former and follower are started on their downward movement and bring the box between the pressers, after which the pressers come together, as above described, and compress the box about the former. The next operation is the stripping of the box from the former, and this is accomplished by means of hooks $M'$, each located on top of its presser and held in position thereon by means of a spring $M^2$, attached to the projection $A^6$. While these hooks or strippers $M'$ project, as they must, slightly over the opposing faces of the pressers, they do not interfere with the downward movement of the former and its box, for the reason that the pressers are at that moment in their rear or separated position. When the former has reached the lower extremity of its stroke and the pressers are pressing against the box, these clearers or strippers $M'$ slightly overlap the edges of the box, and in order to insure their engagement therewith the former is preferably grooved, as shown at $g$. Just before the former begins to rise the pressers are withdrawn sufficiently to release the pressure upon the box ends, and yet not sufficiently to withdraw the strippers $M'$ from over the edge of the box, and dwell momentarily in that position while the former rises, and the box while engaging the strippers is pulled off from the former, the follower in the meantime descending sufficiently far out of the way to allow the stripped box to fall into a receptacle below the machine. The pressers separate still farther when the box has been stripped to allow the follower to rise and a fresh folded blank to be brought between them.

The complete sequence of operations is as follows: The former being in its lowest position below the table A, the pressers being in their pressing position, and the carrier being in its forward position it starts back to get another blank, being enabled to do so while the former is in its lowest position by reason of the opening between the two plates K, which registers with the former-stem $G'$. During this movement the gum-roll is in its upper position, where it remains until the carrier has passed completely under the hopper, the gum-roll, however, being rotated during this movement of the carrier, so that its surface $f$ will be properly gummed. When the carrier has reached its rearward position under the hopper, it receives a blank, and the latch which holds the gummer in its upper position having been released the gum-roll drops upon the carrier E in position to gum the surface $x$ of the blank when the carrier moves forward. The preceding box in the meantime has been finished and stripped and the former G has risen into its highest position, the pressers have separated, and the follower is at the bottom of its stroke. The carrier then passes forward, the grippers $d^2$ grip the blank in place, and the gumming operation takes place, after which the cam-surfaces lift the gum-roll out of contact with the blank and latch it, and the carrier moves into its forward position, its straps $e$ being drawn under the hopper to hold up the blanks therein. The instant the carrier reaches its forward position the follower comes up, clamps the bottom of the blank against the under side of the former, and as it continues to rise the lips $l^5$ are projected beyond its upper surface to lift the ears 2 of the blank against each end of the former. Thereafter the folding-plate J rises with its shear-plates and folds the side 3 of the blank against the former, the shear-plates carrying the flanges 5 around the ends of the former. The plates K also move up, pulling the side 4 from under the grippers and carrying it toward the former, the construction of the lifting-head $k'$, however, being such that although the plates J and K may reach the former at the same instant the flanges 5 are folded before the wings $K'$ start to fold the flanges 6. When the folding of the flanges 6 has progressed sufficiently far for these flanges to prevent the opening out of the ears 2, the pressure on the follower is slightly diminished, and the lips $h^5$ are thereby withdrawn below the surface of the clamp $h'$, so as not to interfere with the smooth folding of the flanges 5 and 6. As soon as the wings have caused the flanges 6 to approach sufficiently near the flanges 5 so that the box is really formed except for the contact of the gummed surface the former and follower start downward and carry the box between the pressers, which move inward after the movement of the follower and former has been stopped and press the gummed surfaces together, at the same time by means of the holders holding the sides of the box against the former. The pressers then separate slightly to release the box, and the former and follower then separate, the carrier having in the meantime been withdrawn to receive another blank and allow the former to rise. During the upward movement of the former the now finished box is caught by the strippers and stripped from the former, the follower moving downward far enough to allow a free passage for the box to drop out from under the machine. The pressers then complete their rearward movement.

It is evident that other means may be provided for accomplishing the same objects which I have accomplished in my machine above described. The main object for which I am contending is the absolute registration of the blank with the former and folding mechanism, so that a more perfect box shall be constructed than, as I believe, has heretofore been possible. My main novel features, as I believe, consist in mechanism which shall comprise a recessed carrier to receive and hold the blank by grippers or other suitable means, which carrier shall have absolute and positive registration with the former, and the clamping of the blank against the former while the blank is still gripped in the carrier, the carrier thus serving not only as a carrier, but as a support for the blank during the folding operation. Another feature of novelty consists in mounting the folding mechanism directly in the carrier, so that it not only forms, in effect, a part of the carrier for the purpose of conveying the blank from the hopper to its folding position, but also, by reason of the fact that the blank is clamped without removal from the carrier, folds the blank with great accuracy about the former. In this connection the necessity for accurate folding at the base of the box must be remembered, for an error at the base is magnified according to the length of the box, so that a minute error scarcely distinguishable at the base may render the box unmarketable because of its dimension at the open end of the box. There are also other peculiarities of construction and movement of my machine which I believe to be of value and importance in principle, the details of which, however, may be materially altered without departing from the substance thereof.

While I have referred to the surface of the former opposite that connected to the stem as the "bottom," I do not mean to imply that the construction of my machine may not be altered so that the clamp shall have a downward movement to clamp the blank and the former and clamp an upward movement to carry the folded blank to the pressers. Moreover, this mechanism may operate laterally instead of vertically, the rest of the mechanism being designed accordingly.

It is also apparent that certain of the mechanism above described may be used in box-machines of other kinds. For example, the recessed carrier may be used with other folding mechanism, and the folding mechanism may be used with a different type of carrier. The pressers also may be used with other folders, and carrying, as they do, the mechanism for preventing bulging of the box during the pressing operation would add materially to the efficiency of any box-machine of this pressure type.

A mechanism mounted on the pressers for preventing bulging during the folding operation I believe to be new with me, and it is evident that it may be operated by other means than those shown so long as it allows the box to be placed freely between the pressers and then coacts with the box during the pressing operation and is thereafter moved to allow the box to be withdrawn.

What I claim as my invention is—

1. In a blank-feeding mechanism, a hopper having an unobstructed feed-opening in its lower side, a reciprocating blank-carrier, and means whereby it is reciprocated, said carrier having a smooth upper surface adapted to support the blanks in said hopper, and provided with a recess of a depth approximately the thickness of the blank adapted to receive a blank of a given shape to hold it by contact with the edges thereof from lateral movement, in combination with means comprising a folding mechanism mounted upon said blank-carrier and adapted to deliver the blank from said carrier, as described.

2. In a blank-feeding mechanism a hopper open at the bottom, a carrier having a smooth upper surface adapted to support the blanks in said hopper and provided with a countersunk blank-shaped recess therein, said recess being surrounded by a suitable wall on all sides of a depth approximately the thickness of a blank whereby the blank will be held from lateral movement in any direction, in combination with means for holding a blank therein, and means for delivering a blank from said carrier comprising a folding mechanism as described.

3. In a blank-feeding mechanism in combination a hopper, a carrier having a smooth upper surface and a countersunk blank-shaped recess in said upper surface of a depth approximately the thickness of a blank, said carrier being adapted to reciprocate under said hopper to support the contents of said hopper during its reciprocating movement and at one extremity of its stroke cause the registration of said recess with said hopper, whereby said recess may receive a blank therefrom in combination with means for reciprocating said carrier and means contained in said carrier whereby the blank is delivered therefrom, as described.

4. In combination a vertical hopper adapted to receive a pile of blanks, a reciprocating carrier and means whereby it is reciprocated, said carrier having a smooth upper surface and a countersunk blank-shaped recess adapted to register with and receive the lower blank in said hopper, said smooth surface of said carrier being adapted to support the pile of blanks during the reciprocation of said carrier to and from its registering position, said carrier being also adapted to register with a folding mechanism, and means for folding a blank mounted in said carrier, as described.

5. In combination, a hopper adapted to receive a pile of blanks, a carrier adapted to receive a blank therefrom, means for gripping said blank in said carrier, means for moving said carrier from a blank-receiving to a blank-folding position, a folding mechanism, and means for clamping said blank at or near its center while it is still gripped in the carrier, comprising opposingly-placed mutually-reciprocating elements, as described.

6. In combination, a hopper adapted to receive a pile of blanks, a carrier adapted to receive a blank therefrom, means for gripping said blank in said carrier, means for moving said carrier from a blank-receiving to a blank-folding position, a folding mechanism, means for clamping said blank at or near its center while it is still gripped in the carrier, and means for withdrawing said blank from said gripping mechanism, as described.

7. In combination, a hopper adapted to receive a pile of blanks, a carrier adapted to receive a blank therefrom, means mounted on said carrier for gripping said blank in said carrier, means for moving said carrier from a blank-receiving to a blank-folding position, and a blank-folding mechanism comprising means for clamping said blank at or near its middle while it is still gripped in said carrier, and means for withdrawing said blank from said gripping mechanism operative after said blank has been clamped, whereby said blank is always held in a fixed position while in said carrier, as described.

8. In combination, a hopper adapted to receive a pile of blanks, a carrier adapted to receive a blank therefrom, means mounted on said carrier for gripping said blank in said carrier, means for moving said carrier from a blank-receiving to a blank-folding position, and a blank-folding mechanism comprising means for clamping said blank at or near its middle while it is still gripped in said carrier, and means for withdrawing said blank from said gripping mechanism located between said gripping mechanism and said clamp, as described.

9. In combination, a hopper adapted to receive a pile of blanks, a carrier adapted to receive a blank therefrom and convey it into registration with a folding mechanism, means mounted on said carrier for gripping said blank in said carrier, and a folding mechanism comprising a clamp to hold a portion of the blank and folders located on each side thereof, one of said folders engaging the blank between said clamp and said gripping mechanism, whereby in the act of folding said blank it will withdraw it from said gripping mechanism, as set forth.

10. In combination with means for receiving, conveying, and folding a box-blank, a hopper adapted to receive a pile of blanks, a gum-roll, means for keeping said gum-roll in rotation, means for allowing said gum-roll to engage with said blank during a portion only of the movement of said blank thereunder, and for withdrawing and holding said gum-roll from the plane of said blank while said gum-roll is still in rotation at other times, as described.

11. A hopper, a movable carrier and a blank-folding mechanism, in combination with a gumming mechanism located between said hopper and said blank-folding mechanism and comprising a gum-roll, means for moving and holding said gum-roll out of contact with the carrier and blank during a portion of the movement of the carrier, and means whereby said roll is rotated during the entire movement of said carrier, as described.

12. In combination with a hopper, a movable carrier to receive and convey a blank, and a folding mechanism whereby the blank is to be folded, said carrier having one or more racks located thereon, and a gumming mechanism comprising a gum-roll and means for lifting said gum-roll above the surface of said blank, said gum-roll carrying one or more gears adapted to engage said racks at all times, whereby said gum-roll will be rotated during the entire movement of said carrier, as described.

13. In combination with a hopper adapted to receive a pile of blanks, and a carrier adapted to withdraw one of said pile of blanks from said hopper, a folding mechanism located to receive said blank from said carrier, and a rotatable gum-roll mounted in a swinging frame between said hopper and said folding mechanism, a cam mechanism located to vary the level of the gumming-surface of said gum-roll with relation to said carrier and mechanism for rotating said gum-roll both when in contact and out of contact with said blank, as described.

14. In combination, a hopper, a blank-folding mechanism, a carrier adapted to travel between said hopper and said blank-folding mechanism, and a gumming mechanism located between said hopper and said blank-folding mechanism, means located upon said carrier adapted to lift said gumming mechanism away from the plane surface of said carrier, and a latch adapted to hold said gumming mechanism in its new position, and means carried by said carrier whereby said latch is withdrawn and said gummer is released to approach said carrier again, all as described.

15. In a box-machine, a table, a hopper located above said table, a folding mechanism and a carrier mounted to travel on said table and adapted to travel between said hopper and said folding mechanism, the front wall of said hopper being provided with an opening thereunder whereby said carrier may enter said hopper to receive a blank therefrom, and means for supporting said blanks in said hopper at substantially the level of the upper surface of said carrier while said carrier is withdrawn from said hopper, said means comprising one or more straps suitably supported attached at their front ends to said carrier, and means whereby the slack of said straps is taken up while said carrier is moving under said hopper, as described.

16. In a box-machine, a reciprocating carrier adapted to hold a blank, means for reciprocating said carrier, a reciprocating former, the bottom of which when in its forming position is located on substantially the level of one surface of said blank, means for reciprocating said former, a reciprocating clamp adapted to clamp said blank against the bottom of said former without removing it from said carrier, means whereby said clamp is reciprocated, and means for folding said blank toward said former.

17. In a box-machine, a former adapted to be intermittently moved, a folding mechanism adapted to completely fold a blank toward said former while said former is stationary, means for moving said former, and means for pressing said folded blank against said former, whereby said box is formed against a stationary former, and is then conveyed on said former to a position to be acted upon by said pressing mechanism, and pressed, all as set forth.

18. In a box-machine, a reciprocating carrier adapted to hold a blank, means for reciprocating said carrier, a reciprocating former the bottom of which when it is in its forming position is located on substantially a level with one surface of said blank and means for reciprocating said former, a reciprocating clamp adapted to clamp said blank against the bottom of said former, means for reciprocating said clamp and means for folding said blank against said former operative after said blank is clamped against said former and while said former remains stationary, as described.

19. In a box-machine, a former adapted to be intermittently moved, a clamp adapted to clamp a blank against the bottom of said former, a folding mechanism adapted to fold said blank against said former, said clamp and said folding mechanism engaging said blank while said former is stationary, a pressing mechanism and means adapted to move said former and clamp while still in their blank-engaging relation from said folding position to a position between said pressers whereby said blank will be clamped and formed against said former while said former is stationary and thereafter while maintaining its relation to said former and said clamp will be pressed between said pressers, as described.

20. In a box-machine, a supporting mechanism adapted to support a blank, a former, the bottom of which when in its forming position is located substantially on a level with one surface of said blank, a clamp adapted to clamp said blank against one end of said former, means for folding the blank toward said former, means located below said blank-supporting mechanism for pressing the blank against said former, and means for causing said former and clamp to carry said blank between said pressing means, and means operating after said pressing means to withdraw the completed box from said former, as described.

21. In a box-machine the combination with a box-forming mechanism comprising a former, and means for bending the sides of the box about said former, pressers adapted to press two opposite portions of the folded box against said former after they have been folded to complete the box, each presser-carrying mechanism projecting at right angles to its pressing-surface adapted to engage the unpressed portions of said box to prevent their bulging during the pressing operation, as described.

22. In a box-machine, a blank-support, an intermittently-moving former, the bottom of which is normally located substantially on a level with the opposing surface of said blank, a clamp registering with and adapted to clamp a portion of said blank against the bottom of said former, means adapted to fold said blank toward said former, said clamping and said forming mechanism engaging said blank while said former is stationary, and a pressing mechanism located below said blank-support and adapted to press the ends of said blank against said former and cause the completion of the box, and means for carrying said former and blank between said pressers, and means connected to said pressers whereby the sides of said box are prevented from bulging during the pressing operation, as described.

23. In a box-machine, in combination with means for clamping the blank, comprising a folder, a reciprocating blank-carrier having means mounted thereon for folding a blank, and means whereby said folding means may be operated, as described.

24. In a box-machine a reciprocating blank-carrier having means mounted thereon for folding the blank adapted to support the blank prior to its folding operation, in combination with means for operating said folding mechanism, and a former coöperating therewith about which said folding means may operate, as described.

25. In a box-machine, a hopper, a former, and a reciprocating carrier means for recipro cating said carrier, said carrier being adapted to reciprocate between a position under said hopper and a position under said former, and being provided with folders, and means located below the line of movement of said carrier, whereby said folders are caused to lift the sides of said blank toward said former and fold the flanges of said blank against the ends of said former, as described.

26. In a box-machine, a hopper, a former, and a reciprocating carrier means for reciprocating said carrier, said carrier being adapted to reciprocate between a position under said hopper and a position under said former, and being provided with folders adapted to support said blank in transit, and means located below the line of movement of said carrier, whereby said folders are caused to lift the sides of said blank toward said former and fold the flanges of said blank against the ends of said former, as described.

27. In a box-machine in combination with a carrier and a former, means for folding a box-blank about said former, said means comprising folders mounted in said carrier, and rocker-arms separable from but adapted to engage with said folders, and means whereby said rocker-arms are rocked to move said folders toward said former and cause portions of said folders to wrap the flanges of said blank about the edges of said former, as described.

28. In a box-machine, a reciprocating carrier and folding mechanism comprising a swinging folder with wings hinged thereto, said folder being located upon said carrier and means for lifting said folder toward said former comprising a rocker-arm having a head, carrying-fingers adapted to engage said wings, and a yielding central portion adapted to engage the main portion of said folder, as and for the purposes described.

29. In a box-machine, a reciprocating carrier and folding mechanism comprising a former and a hinged slotted folder mounted in said carrier, and two shear-plates each mounted on the axis of said folder and adapted to move through slots therein, and means for moving said folder comprising a rocker-arm and means for rocking it to engage said shear-plates and said folder and move them toward said former, as described.

30. In a box-machine, a reciprocating carrier and a folding mechanism comprising two folding-plates mounted on parallel axes in said carrier, means for moving said folding-plates toward said former, said means comprising two rocker-arms adapted to engage the under side of said folding-plates, said plates being provided with means adapted to engage said rocker-arms, whereby said folding-plates may be withdrawn from their position about said former and into their original position, as described.

31. In a box-machine in combination with a reciprocating carrier having means mounted thereon for folding a blank and means for reciprocating said carrier, a former adapted to coöperate with said folding means, and rocker-arms separable from said folding means but adapted to engage them and move them toward said former to fold a blank about said former, as described.

32. In a box-machine, in combination with a former and means for folding the sides and ends of the blank about a former, the bottom of said former being normally located substantially on a level with one surface of said blank, a yielding clamp adapted to clamp said blank against the bottom of said former, and provided with lips adapted when said clamp is compressed against said blank and former, to project beyond the upper surface of said clamp, whereby they may engage with flaps on said blank and cause them to be folded at right angles to the bottom of the former during said clamping operation, and means whereby the pressure upon said clamp is lessened to withdraw said lips while said sides and ends are being folded without separating said clamp and said former, as described.

33. In a box-machine a hopper, a reciprocating former, a reciprocating clamp, a carrier adapted to travel between a receiving position under said hopper and a position under said former, means for reciprocating said carrier, means for gumming in transit a blank carried by said carrier, said carrier being provided with an opening through which said reciprocating former and said reciprocating clamp may be operated, folders carried by said former located on each side of said former and forming a portion of the blank-receiving surface thereof, and means whereby said folders are operated to fold the blank against said former, all as set forth.

34. In a box-machine, in combination, a hopper, a carrier provided with folders, a former, means for reciprocating said carrier from a blank-receiving position under said hopper to a position under said former, a yielding clamp, and means to reciprocate it to clamp a blank against the bottom of said former, said clamp being provided with lips to engage projections from said blank and turn them about said former during its clamping operation, means for oscillating said folders to fold said blank against said former, and means for withdrawing said lips from interference with said folders during the folding operation, as and for the purposes described.

35. In a box-machine, a former and means whereby it is reciprocated, a clamp and means whereby it is reciprocated, said clamp having substantially the same area as the bottom surface of the former and adapted to clamp that portion of the blank which is to form the bottom of the box against the bottom surface of said former, the bottom of said former also being slightly concaved and the opposing surface of said clamp being correspondingly convexed, whereby said blank is stretched about the edge of said former during the folding operation and a right angle is assured along each side of the bottom of the finished box, in combination with means whereby the unclamped portions of said blank are folded about said former, as described.

36. In a box-machine in combination with a gummer, a former and means for folding a box-blank about said former, means for causing the gummed surfaces of said blank after it has been folded, to adhere, comprising reciprocating pressers, and means whereby they are reciprocated, and holders mounted on the face of each presser adapted to engage the unpressed sides of the box during the pressing operation, whereby the bulging of said unpressed sides will be prevented, and means for conveying said former with said box-blank folded about it from between said folders to between said pressers, as described.

37. In a box-machine, in combination, a gummer, a blank-supporting mechanism for supporting the portions of the blank which are to form the sides and ends of the folded box, a former, means for clamping that portion of the blank which is to form the bottom of the box against the under surface of the former, means for folding those portions of the box which are to form the sides and ends of the box about said former, pressing means, means whereby said former having said blank folded about it is carried from between said folders to between said pressing means, and said pressing means are operated to insure the adhering of the gummed surfaces of said folded blank, as described.

38. In a box-machine, in combination with means for folding a blank around a movable former means whereby said former is moved, means for pressing said blank when so folded against the surfaces of said former, a stripping mechanism comprising engaging surfaces located upon said pressers out of engagement with the sides of said blank during the pressing operation and means whereby said surfaces are caused to engage with the upper edge of the box during the outward movement of the former, whereby said box is stripped from said former, as set forth.

39. In a box-machine, in combination with a gummer a movable former means whereby said former is moved and means whereby a blank is folded about it, a pressing mechanism whereby the gummed surfaces of said blank are pressed to insure their adhesion, a stripping mechanism comprising one or more engaging surfaces located on said pressers out of engagement with the sides of said blank during the pressing operation, and means whereby said surfaces are caused to engage the upper edge of said box and strip the box from said former during the withdrawal of said former, said former being cut away to register with said engaging surfaces, as and for the purposes described.

40. In a box-machine, in combination a carrier, means for supplying a blank thereto, and means for gumming said blank, means for folding said blank, comprising a former having its bottom located on substantially the level of the opposing surface of said blank, a yielding clamp provided with means for folding the ears 2 of the blank against the former, means for folding the sides and ends of the blank to complete the folding of the box, means whereby said flap-folding portions of said clamp are withdrawn from their folding position while said clamp is still clamping said blank against the bottom of said former, means for reciprocating said former while said folders are still in their folding position, whereby said folded blank is passed down through said folding mechanism, a presser mechanism located below the path of said carrier and adapted to receive and press said blank about said former, and a stripping mechanism adapted to strip the completed box from said former, all as set forth.

41. In a box-machine, a blank-support, a former, a clamp adapted to clamp a blank while in said support against said former, means for folding said blank about said former, a pressing mechanism located below said blank-support, means for reciprocating said former and clamp from a position above said blank-support to a position within said pressing mechanism while said folding mechanism is in its folding position, whereby the blank is kept in a folded position while in transit, and means for causing said pressing mechanism to press the blank against said former, all as described.

42. In a box-making machine, the reciprocating carrier and means whereby it may be reciprocated, said carrier having a recess in its upper surface to receive a blank, a folding mechanism mounted in said carrier and forming a portion of the bottom of said blank-receiving recess, means for operating said folding mechanism normally disconnected from said folding mechanism, as described.

43. In a box-machine, in combination with a former, a reciprocating carrier and means whereby said carrier may be reciprocated, means for folding a box-blank about said former, said means comprising folders mounted upon and forming a part of the blank-supporting surface of said carrier, and means normally disconnected from said folders whereby said folders may be operated to fold a blank about said former when said carrier is located in proximity thereto, as described.

44. In a box-machine, in combination with a reciprocating former and a reciprocating clamp, a reciprocating carrier having folders hinged therein adapted to support a blank carried by said carrier, and also having an opening between said folders adapted to allow said former to pass therethrough, means adapted to reciprocate said clamp and said former whereby said former when at one extremity of its movement will be substantially in contact with a blank carried by said carrier and said clamp will clamp said blank against said former, and means whereby said folders will thereafter fold said blank about said former, as described.

45. In a box-machine, in combination with a reciprocating former and a reciprocating clamp, a reciprocating carrier having hinged folders mounted therein and an opening between said folders adapted to allow said former to pass therethrough, means for locking a blank upon said carrier, and means adapted to reciprocate said clamp and said former, whereby said former when at one extremity of its motion will be in substantial contact with the blank carried by said carrier, said clamp will clamp said blank against said former when said former is in said position, and means whereby said folders are thereafter operated to fold said blank around said former, and means for withdrawing said blank from said carrier, as described.

46. In a machine adapted to fold a box-blank about a former, in combination, a reciprocating former, adapted to engage the bottom portion of said blank, means whereby it is reciprocated, means for folding a blank about said former, and means for clamping the bottom portion of said blank against the bottom of said former during the operation of said folding mechanism, said former having a slightly-concaved surface and said clamp a correspondingly convexed surface, whereby the bottom portion of said blank will be concaved slightly during the folding operation and the finished box will present a flat unbulging bottom section, as described.

47. In a machine adapted to form a box from a blank, a folding mechanism comprising a former and means for holding the portion of the blank which is to form the bottom of the box against said former, means for folding the blank around said former, said means for holding the bottom portion of the blank against said former being adapted to concave such portion of the blank during the folding operation, as described.

48. In a machine for making a box from a single piece of material, means for holding the portion of said material which is to form the bottom of the box concaved during the folding operation, and means for folding up the portions of the box adjacent to said bottom portion while said bottom is so held in such concaved shape, whereby the sides of said box are folded at an acute angle to the bottom of the box but parallel with each other.

In testimony whereof I hereunto set my name this 27th day of December, 1901.

CHARLES E. WHITE.

Witnesses:
WILSON FISKE,
GEORGE O. G. COALE.